(12) United States Patent
Torii

(10) Patent No.: US 11,887,445 B2
(45) Date of Patent: Jan. 30, 2024

(54) INFORMATION PROCESSING APPARATUS, INFORMATION PROCESSING SYSTEM, INFORMATION PROCESSING METHOD, AND PROGRAM

(71) Applicant: SONY GROUP CORPORATION, Tokyo (JP)

(72) Inventor: Kuniaki Torii, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 336 days.

(21) Appl. No.: 17/310,543

(22) PCT Filed: Jan. 10, 2020

(86) PCT No.: PCT/JP2020/000664
§ 371 (c)(1),
(2) Date: Aug. 10, 2021

(87) PCT Pub. No.: WO2020/170643
PCT Pub. Date: Aug. 27, 2020

(65) Prior Publication Data
US 2022/0068096 A1 Mar. 3, 2022

(30) Foreign Application Priority Data
Feb. 19, 2019 (JP) ................................. 2019-027829

(51) Int. Cl.
*G08B 13/196* (2006.01)
(52) U.S. Cl.
CPC .............................. *G08B 13/19613* (2013.01)
(58) Field of Classification Search
None
See application file for complete search history.

(56) References Cited

U.S. PATENT DOCUMENTS 11,537,935 B2 * 12/2022 Rugel ..................... G06N 20/00
2017/0366945 A1 * 12/2017 Uliyar ..................... G01S 19/51
(Continued)

FOREIGN PATENT DOCUMENTS

| JP | 2004-126800 A | 4/2004 |
| JP | 2005-292942 A | 10/2005 |

(Continued)

OTHER PUBLICATIONS

International Search Report and Written Opinion of PCT Application No. PCT/JP2020/000664, dated Mar. 17, 2020, 08 pages of ISRWO.

*Primary Examiner* — Fekadeselassie Girma
(74) *Attorney, Agent, or Firm* — CHIP LAW GROUP

(57) ABSTRACT

Realized is a configuration that monitors a behavior of a visitor and issues an alert or performs some other action in the case where a suspicious behavior is detected. The configuration includes a data processing section configured to monitor the behavior of the visitor. The data processing section identifies the visitor, acquires profile information of the identified visitor, determines a behavior monitoring mode of the visitor on the basis of the profile information, and monitors the behavior of the visitor according to the determined behavior monitoring mode. For example, the data processing section calculates a security risk on the basis of the profile information of the visitor and profile information of a visited user, determines the behavior monitoring mode of the visitor according to the calculated security risk, performs a process of monitoring the behavior of the visitor according to the determined mode, and issues an alert or performs some other action in the case where a suspicious behavior is detected.

18 Claims, 15 Drawing Sheets

(56) References Cited

U.S. PATENT DOCUMENTS

| | | | |
|---|---|---|---|
| 2018/0341814 A1 | 11/2018 | Li et al. | |
| 2018/0350144 A1* | 12/2018 | Rathod | G06Q 20/3224 |
| 2020/0259852 A1* | 8/2020 | Wolff | G06N 7/01 |
| 2021/0042844 A1* | 2/2021 | Potter | G06Q 40/08 |
| 2023/0095415 A1* | 3/2023 | Boyer | H04L 63/1408 |
| | | | 726/23 |

FOREIGN PATENT DOCUMENTS

| | | |
|---|---|---|
| JP | 2012-043108 A | 3/2012 |
| JP | 2016-177484 A | 10/2016 |

\* cited by examiner

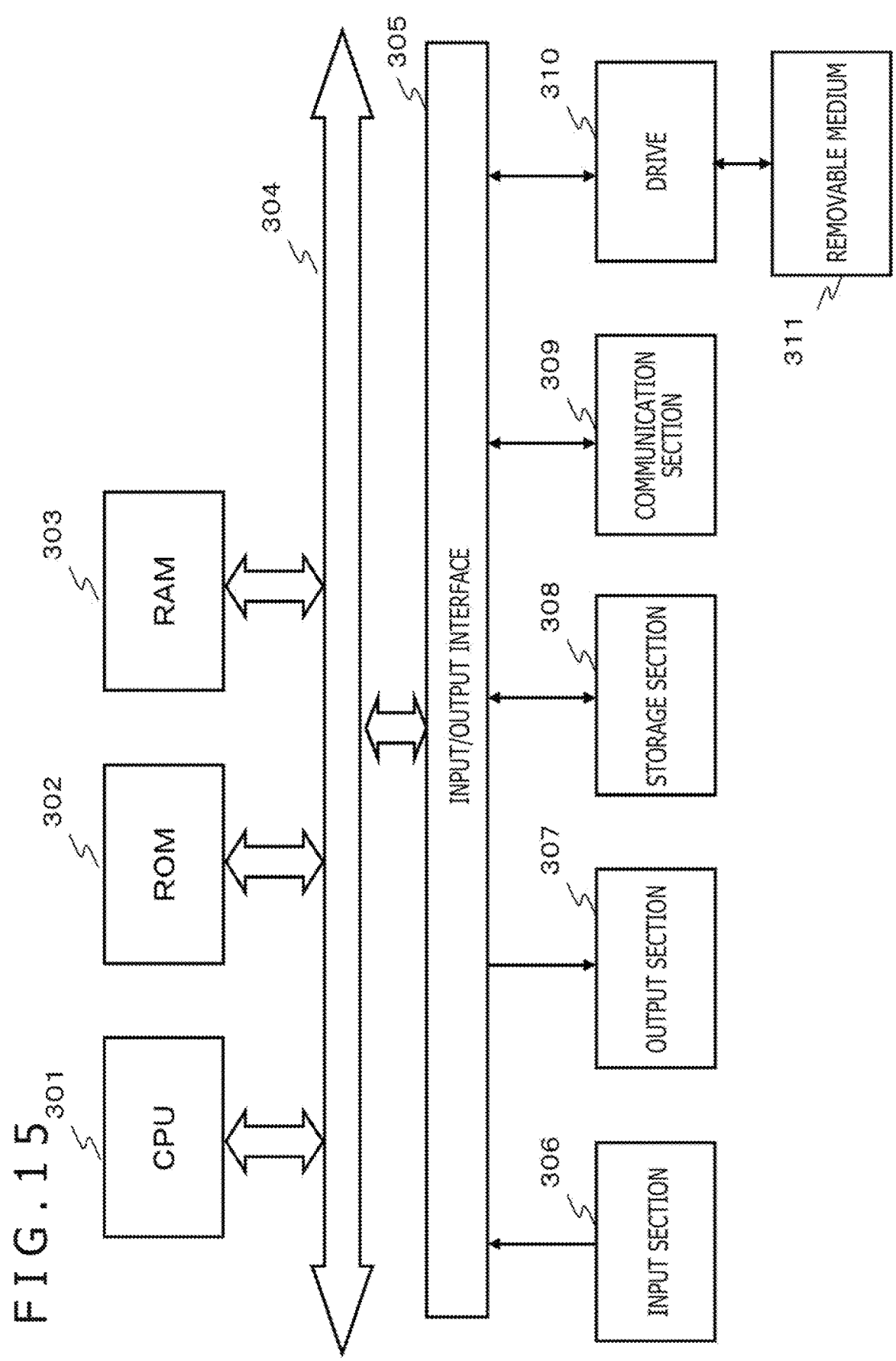

INFORMATION PROCESSING APPARATUS, INFORMATION PROCESSING SYSTEM, INFORMATION PROCESSING METHOD, AND PROGRAM

CROSS REFERENCE TO RELATED APPLICATIONS

This application is a U.S. National Phase of International Patent Application No. PCT/JP2020/000664 filed on Jan. 10, 2020, which claims priority benefit of Japanese Patent Application No. JP 2019-027829 filed in the Japan Patent Office on Feb. 19, 2019. Each of the above-referenced applications is hereby incorporated herein by reference in its entirety.

TECHNICAL FIELD

The present disclosure relates to an information processing apparatus, an information processing system, an information processing method, and a program. More specifically, the present disclosure relates to an information processing apparatus, an information processing system, an information processing method, and a program that perform control, for example, such that a package delivery process is performed safely by a delivery person.

BACKGROUND ART

In many cases, packages are delivered by delivery persons of package delivery companies. However, there are cases where delivery persons are suspicious. Many users receiving packages (recipients) are hesitant to allow delivery persons into an entrance.

Efforts are underway in recent years to develop systems for delivering packages using self-propelled robots or the like.

For example, PTL 1 (Japanese Patent Laid-Open No. 2004-126800) discloses a transport robot of important materials.

In the present circumstances, however, almost all package deliveries are made by people. In many cases, the package delivery persons are strangers for users (package recipients), and the users often cannot open their entrance doors without worry.

CITATION LIST

Patent Literature

[PTL 1]
Japanese Patent Laid-Open No. 2004-126800

SUMMARY

Technical Problem

The present disclosure has been devised in light of the foregoing problem, and it is an object of the present disclosure to provide an information processing apparatus, an information processing system, an information processing method, and a program that allow a user to receive a package without worry by monitoring a behavior of a package delivery person or performing some other action.

Solution to Problem

A first aspect of the present disclosure is an information processing apparatus that includes a data processing section configured to monitor a behavior of a visitor. The data processing section identifies the visitor, acquires profile information of the identified visitor, determines a behavior monitoring mode of the visitor on the basis of the profile information of the visitor, and monitors the behavior of the visitor according to the determined behavior monitoring mode.

Further, a second aspect of the present disclosure is an information processing system including a monitoring robot and a management server. The monitoring robot sends a captured image of a visitor to the management server. The management server identifies the visitor on the basis of the image received from the monitoring robot, acquires profile information of the identified visitor, determines a behavior monitoring mode of the visitor on the basis of the profile information of the visitor, and sends the determined behavior monitoring mode to the monitoring robot. The monitoring robot monitors a behavior of the visitor according to the behavior monitoring mode received from the management server.

Further, a third aspect of the present disclosure is an information processing method performed by an information processing apparatus, the information processing apparatus including a data processing section configured to monitor a behavior of a visitor. The data processing section identifies the visitor, acquires profile information of the identified visitor, determines a behavior monitoring mode of the visitor on the basis of the profile information of the visitor, and monitors the behavior of the visitor according to the determined behavior monitoring mode.

Further, a fourth aspect of the present disclosure is an information processing method performed by an information processing system including a monitoring robot and a management server. The monitoring robot sends a captured image of a visitor to the management server. The management server identifies the visitor on the basis of the image received from the monitoring robot, acquires profile information of the identified visitor, determines a behavior monitoring mode of the visitor on the basis of the profile information of the visitor, and sends the determined behavior monitoring mode to the monitoring robot. The monitoring robot monitors a behavior of the visitor according to the behavior monitoring mode received from the management server.

Further, a fifth aspect of the present disclosure is a program for causing an information processing apparatus to perform information processing, the information processing apparatus including a data processing section configured to monitor a behavior of a visitor. The program causes the data processing section to perform a process of identifying the visitor and acquiring profile information of the identified visitor, a process of determining a behavior monitoring mode of the visitor on the basis of the profile information of the visitor, and a process of monitoring the behavior of the visitor according to the determined behavior monitoring mode.

It should be noted that the program of the present disclosure can be, for example, provided to an information processing apparatus or a computer system capable of executing a variety of program codes, by using a storage medium or a communication medium that provides the program in a computer-readable manner. A process commensurate with the program is realized on the information processing apparatus or the computer system as a result of the provision of such a program in a computer-readable manner.

Still other objects, features, and advantageous effects of the present disclosure will become apparent from more detailed description based on an embodiment of the present disclosure which will be described later and attached drawings. It should be noted that the term "system" in the present specification refers to a logical set of a plurality of apparatuses, and the apparatuses each serving as a component are not necessarily accommodated in the same enclosure.

Advantageous Effect of Invention

According to a configuration of an embodiment of the present disclosure, a configuration is realized that monitors a behavior of a visitor and issues an alert or performs some other action in the case where a suspicious behavior is detected.

Specifically, for example, the configuration includes a data processing section configured to monitor the behavior of the visitor. The data processing section identifies the visitor, acquires profile information of the identified visitor, determines a behavior monitoring mode of the visitor on the basis of the profile information, and monitors the behavior of the visitor according to the determined behavior monitoring mode. For example, the data processing section calculates a security risk on the basis of the profile information of the visitor and profile information of a visited user, determines the behavior monitoring mode of the visitor according to the calculated security risk, performs a process of monitoring the behavior of the visitor according to the determined mode, and issues an alert or performs some other action in the case where a suspicious behavior is detected.

The present configuration realizes a configuration that monitors the behavior of the visitor and issues an alert or performs some other action in the case where a suspicious behavior is detected.

It should be noted that an advantageous effect described in the present specification is merely illustrative and not restrictive, and there may be additional advantageous effects.

BRIEF DESCRIPTION OF DRAWINGS

FIG. 15 is a diagram describing an example of a hardware configuration of the monitoring robot and a management server of the present disclosure.

DESCRIPTION OF EMBODIMENT

Figure 1:
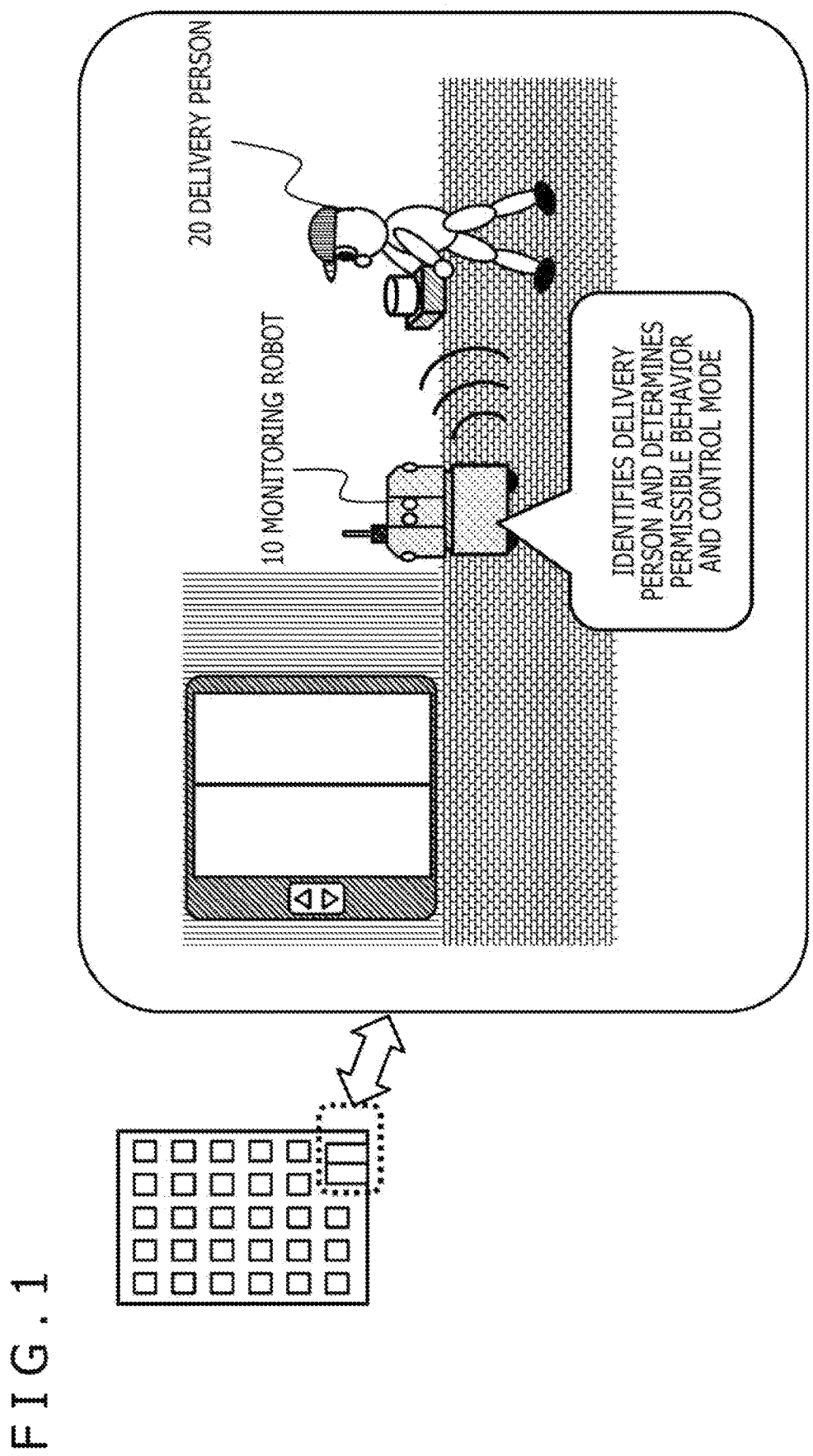
FIG. 1 is a diagram describing an example of a process performed by a monitoring robot of the present disclosure.

A detailed description will be given below of an information processing apparatus, an information processing system, an information processing method, and a program of the present disclosure with reference to drawings. It should be noted that the description will be given in accordance with the following headings:

1. Outline of the processes performed by the information processing apparatus of the present disclosure
2. Configuration example of the information processing system of the present disclosure
3. Configuration example of the monitoring robot
4. Sequence of process performed by the monitoring robot
5. Example of hardware configuration of each apparatus
6. Conclusion regarding the configuration of the present disclosure

[1. Outline of the Processes Performed by the Information Processing Apparatus of the Present Disclosure]

A description will be given first of outline of processes performed by an information processing apparatus of the present disclosure with reference to FIG. 1 and subsequent drawings.

The information processing apparatus of the present disclosure is a monitoring robot 10 illustrated in FIG. 1.

FIG. 1 illustrates a state in which the monitoring robot 10 identifies a delivery person 20 of a package who has entered an entrance hall of a condominium.

The monitoring robot 10 includes a camera and other sensors and identifies the delivery person by making a comparison with delivery person information stored in advance in a storage section on the basis of detection information of the delivery person 20 such as an image captured by the camera.

It should be noted that the storage section stores profile information such as not only face images of registered delivery persons but also their ages, genders, physiques, numbers of years of service, user evaluation information, and criminal records, and the monitoring robot 10 determines a permissible behavior of the delivery person 20 and a control mode on the basis of these pieces of the profile information.

It should be noted that, in the case where there are two or more delivery persons, the monitoring robot 10 individually acquires the profile of each delivery person.

It should be noted that, although a delivery person identification process and a control mode determination process may be performed by the monitoring robot 10 itself, these processes may be performed by a management server capable of communicating with the monitoring robot 10 rather than by the monitoring robot 10 itself.

In this case, the monitoring robot 10 sends detection information of the delivery person 20 such, for example, as a camera-captured image to the management server via a communication section. The management server identifies the delivery person by comparing the image received from the monitoring robot 10 with the delivery person information stored in advance in a database.

Profile information such as not only face images of registered delivery persons but also their ages, genders, physiques, numbers of years of service, user evaluation information, and criminal records is stored in the database. The management server determines the permissible behavior of the delivery person 20 and the control mode on the basis of these pieces of profile information and notifies the determined information to the monitoring robot 10.

The monitoring robot 10 monitors the delivery person 20 and performs control according to the notice received from the management server.

A description will be given below of examples of processes of monitoring the behavior of the delivery person 20 and performing control by the monitoring robot 10 with reference to FIG. 2 and subsequent drawings.

Figure 2:
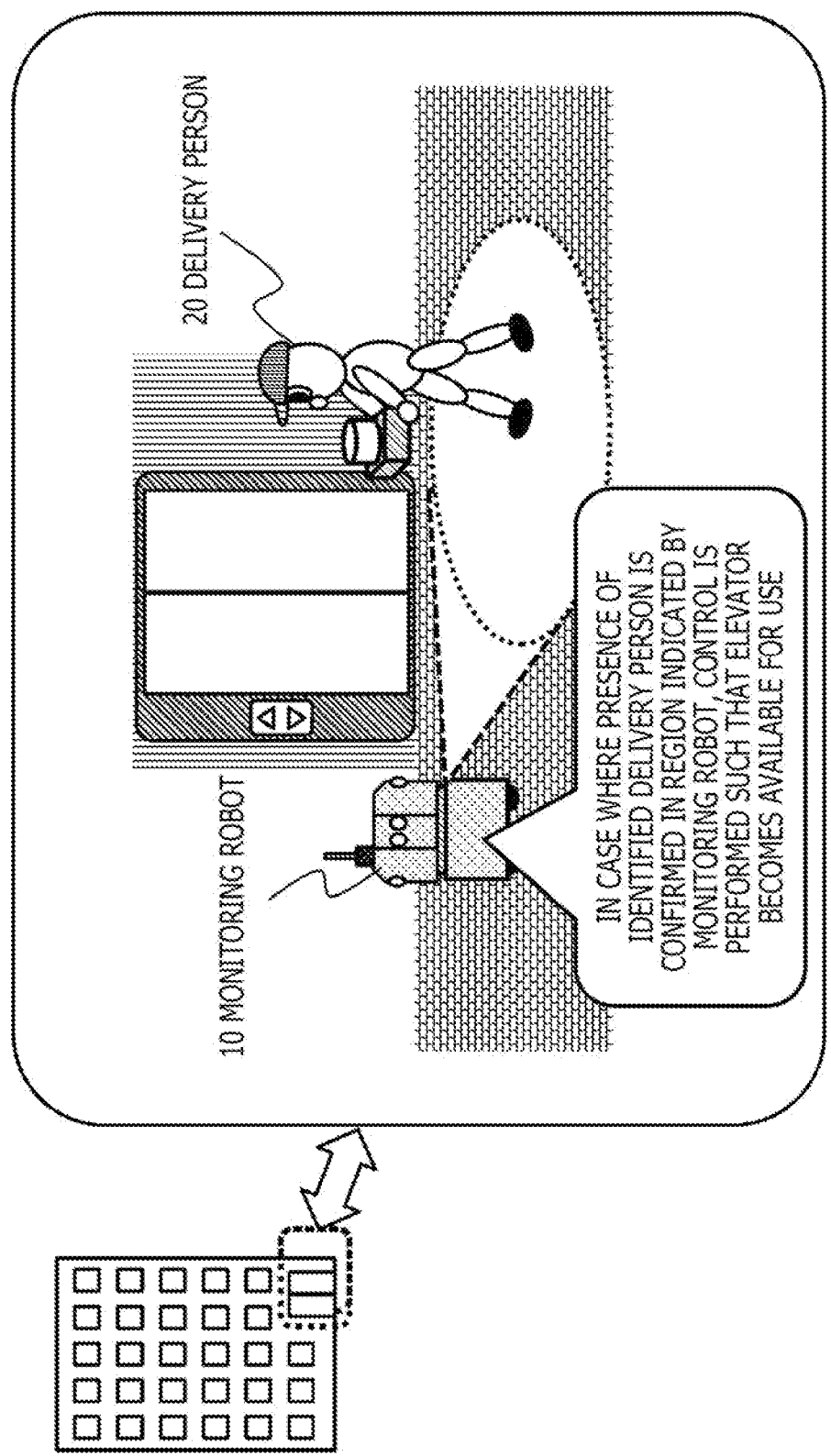
FIG. 2 is a diagram describing an example of a process performed by the monitoring robot of the present disclosure.

The example illustrated in FIG. 2 is an example of the process performed by the monitoring robot 10 at the entrance hall of the condominium as in FIG. 1.

It is assumed that a delivery destination of the package is an upper floor of the condominium such as B's apartment on the fifth floor. It should be noted that the monitoring robot 10 identifies the destination as a result of input by the delivery person or by reading code information such as a barcode or a QR code (registered trademark) attached to the package or the like.

After identifying that the destination is on the fifth floor, the monitoring robot 10 guides the delivery person 20 by illuminating a spotlight region in front of an elevator.

When confirming that the delivery person 20 has entered the spot illumination light region, the monitoring robot 10 controls the elevator in such a manner as to allow the delivery person 20 to move from the first floor where the entrance hall is located to the fifth floor.

Figure 3:
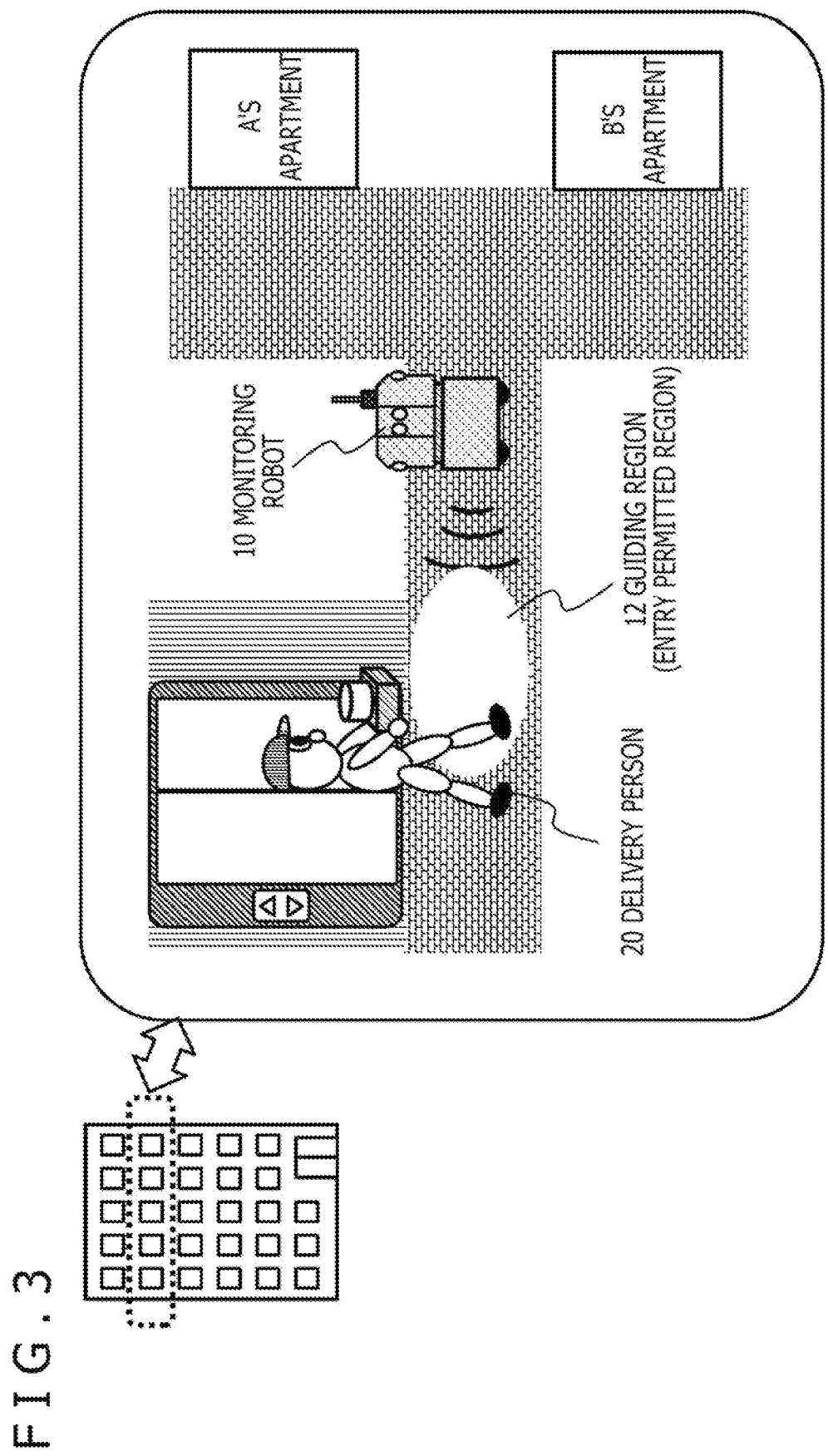
FIG. 3 is a diagram describing an example of a process performed by the monitoring robot of the present disclosure.

FIG. 3 is an example of the fifth floor where B's apartment which is the delivery destination of the package is located.

The monitoring robot 10 illustrated in FIG. 3 is a robot different from the robot at the entrance hall. It should be noted that the robot at the entrance hall may get into the elevator and move with the delivery person 20.

As illustrated in FIG. 3, the monitoring robot 10 illuminates a walking surface with a spotlight to guide the delivery person 20 to B's apartment which is the delivery destination of the package. The illuminated region is set as a guiding region (entry permitted region) 12.

The delivery person 20 can move to the delivery destination of the package by proceeding according to the spotlight region.

Figure 4:
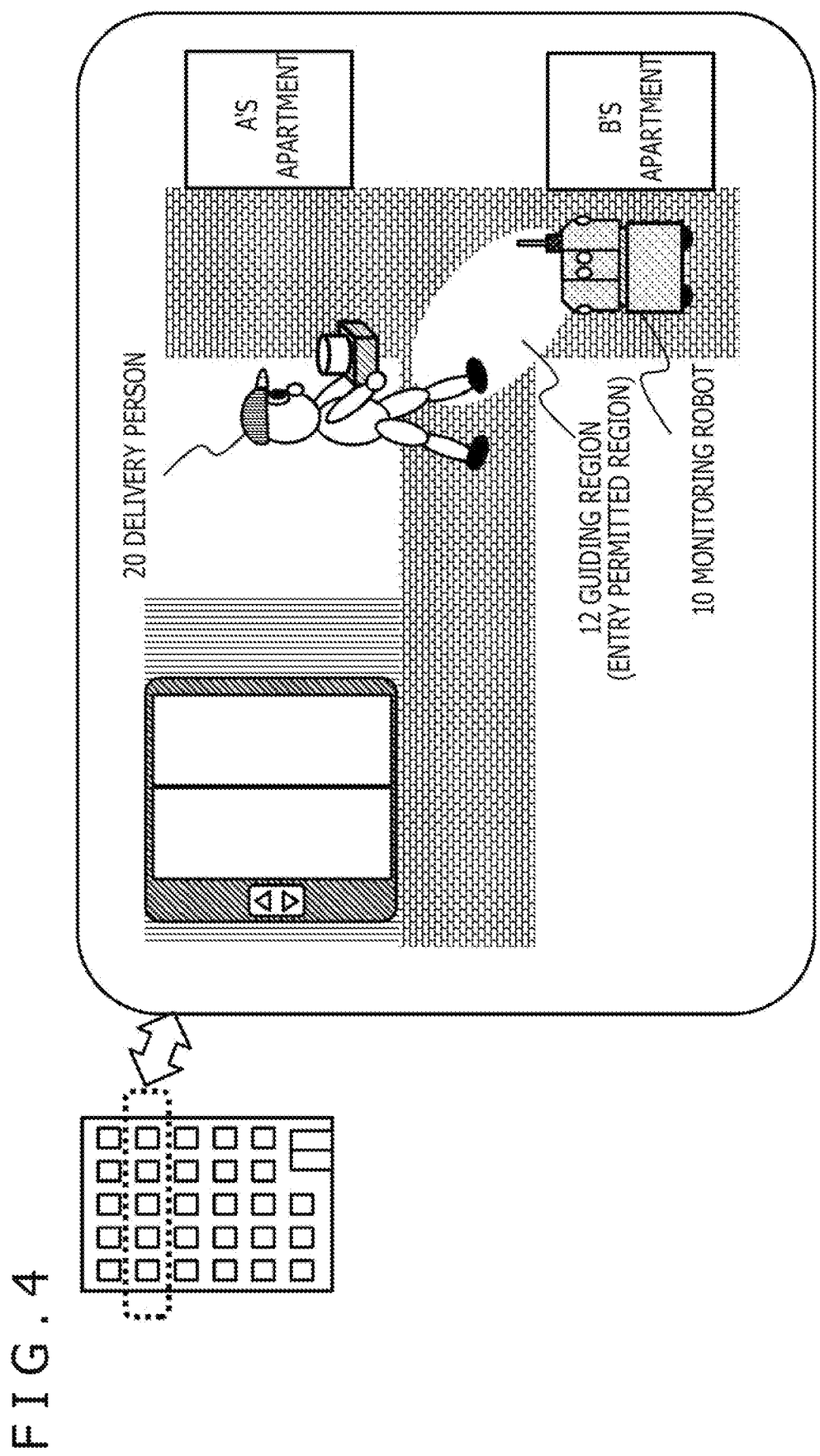
FIG. 4 is a diagram describing an example of a process performed by the monitoring robot of the present disclosure.

FIG. 4 also illustrates the manner in which the monitoring robot 10 continuously performs illumination with a spotlight to guide the delivery person 20 to B's apartment which is the delivery destination of the package, as does FIG. 3. The spotlight-illuminated region is set as the guiding region (entry permitted region) 12.

Figure 5:
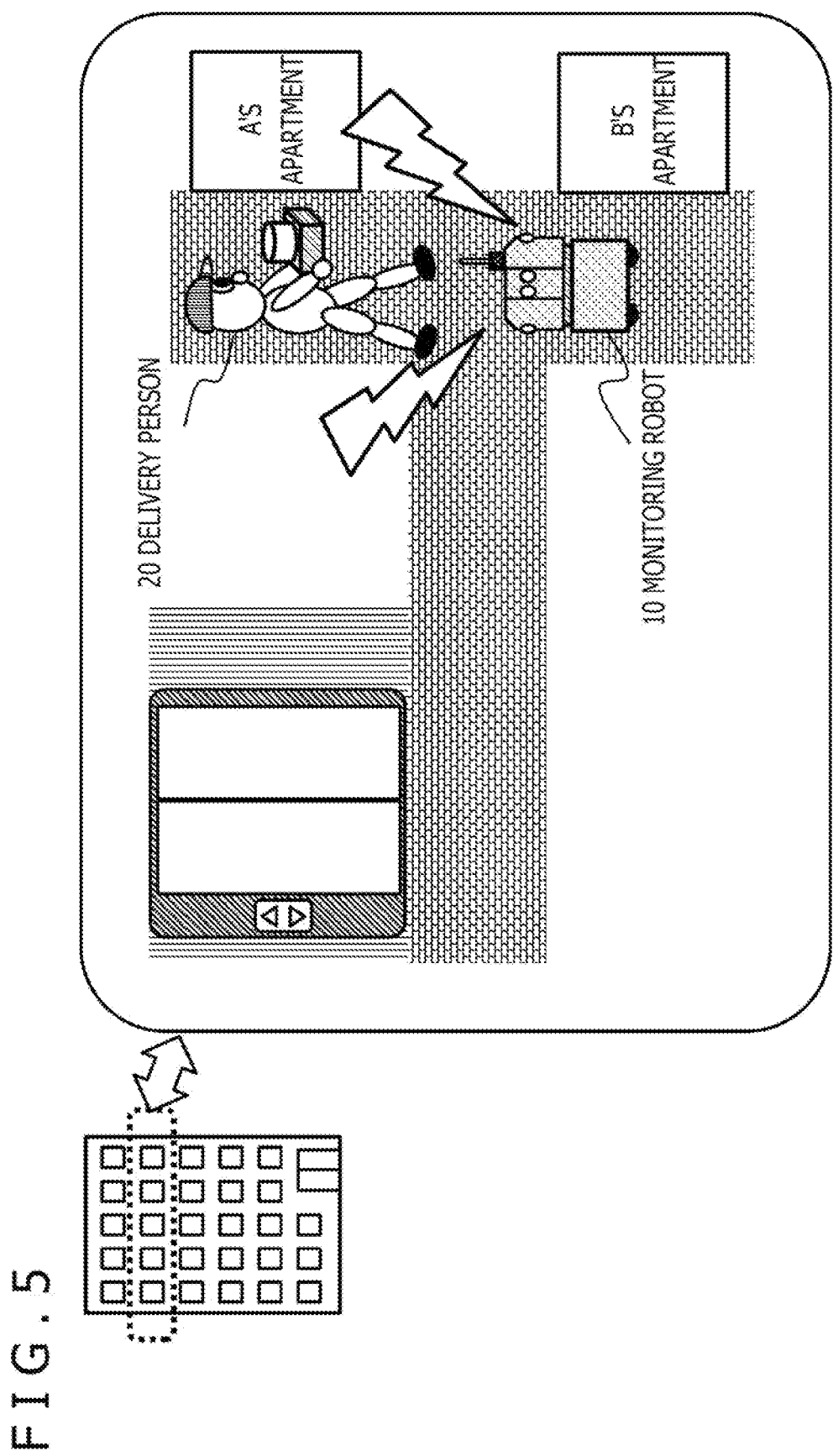
FIG. 5 is a diagram describing an example of a process performed by the monitoring robot of the present disclosure.

FIG. 5 is a diagram describing an example of a process performed in the case where the delivery person 20 moving toward A's apartment different from B's apartment which is the delivery destination of the package.

As described above, in the case where the delivery person 20 enters a region outside the guiding region (entry permitted region) 12, that is, a no-entry region, the monitoring robot 10 issues an alert. Further, the monitoring robot 10 records violative behavior information of the delivery person in a storage section as a profile of the delivery person. Alternatively, the monitoring robot 10 performs a process of notifying the management server and causing the management server to record the violative behavior information in the database.

Also, in the case where the delivery person 20 continues with the violative behavior even after the alert has been issued, the monitoring robot 10 notifies a security company to call a security guard. The security company may be directly notified by the monitoring robot 10 or notified via the management server.

Figure 6:
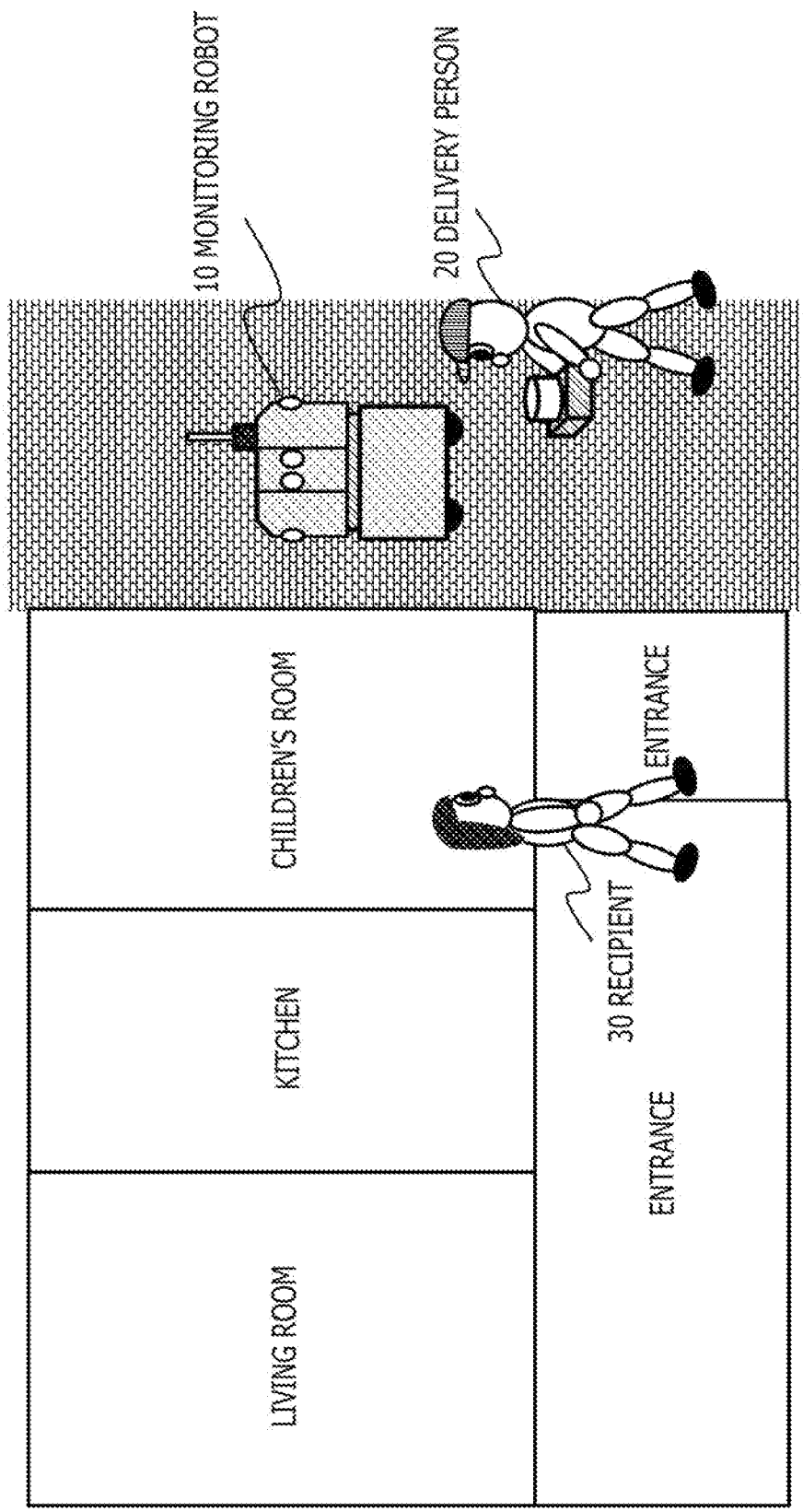
FIG. 6 is a diagram describing an example of a process performed by the monitoring robot of the present disclosure.

FIG. 6 illustrates a process in which the delivery person 20 hands over the package to a recipient (B) 30 at B's apartment which is the delivery destination of the package.

The monitoring robot 10 also monitors the behavior of the delivery person 20 during this handover of the package.

Figure 7:
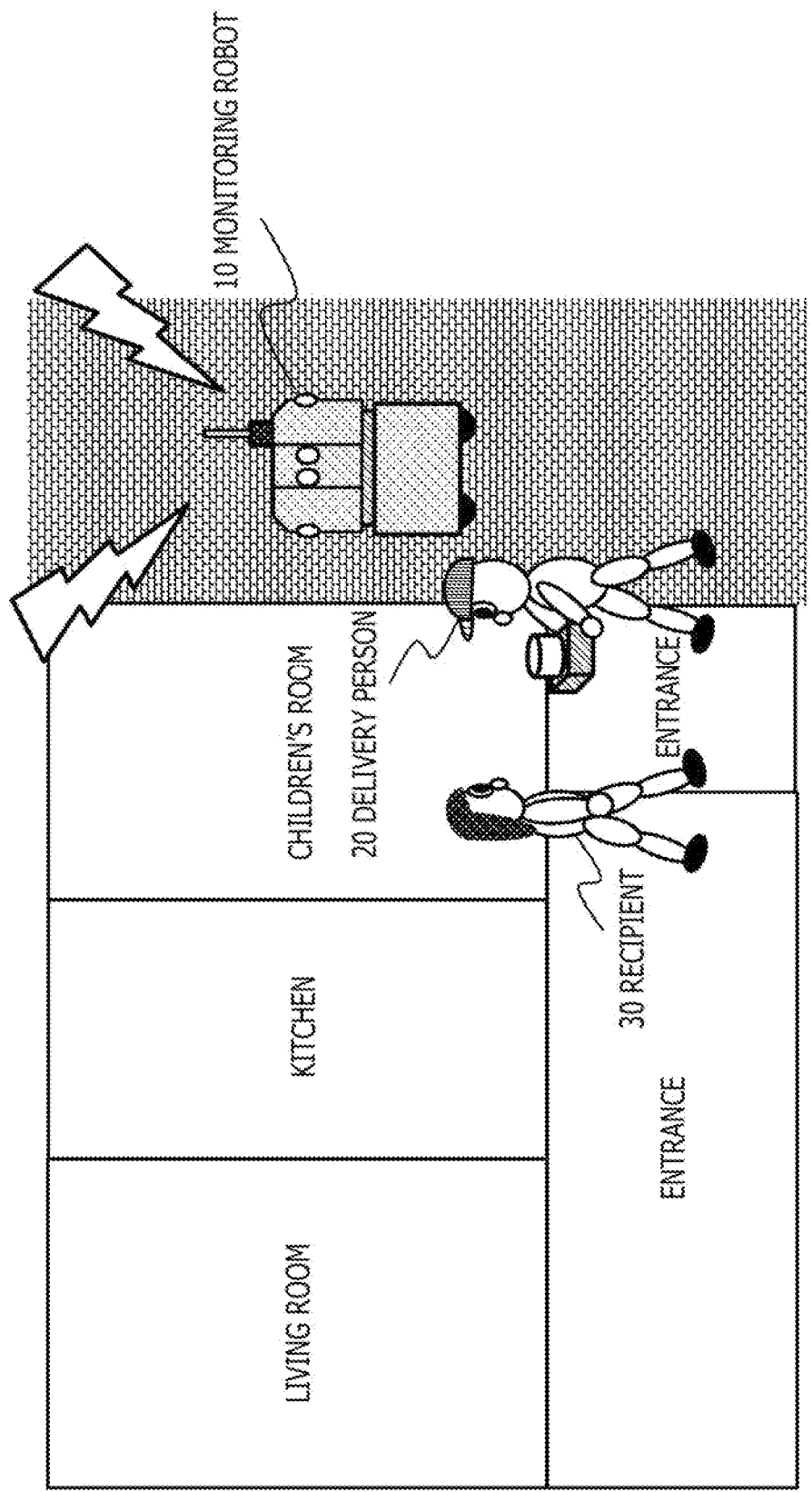
FIG. 7 is a diagram describing an example of a process performed by the monitoring robot of the present disclosure.

For example, in the case where the delivery person 20 intrudes into the apartment of the recipient 30, the monitoring robot 10 issues an alert as illustrated in FIG. 7. Further, the monitoring robot 10 records the violative behavior information of the delivery person to the storage section as the profile of the delivery person. Alternatively, the monitoring robot 10 performs the process of notifying the management server and causing the management server to record the violative behavior information in the database.

In the case where the delivery person 20 continues with the violative behavior even after the alert has been issued, the monitoring robot 10 notifies the security company to call the security guard.

It should be noted that there are cases where delivered goods such as a television set or furniture need to be carried to a given position in the user's apartment and installed there.

Figure 8:
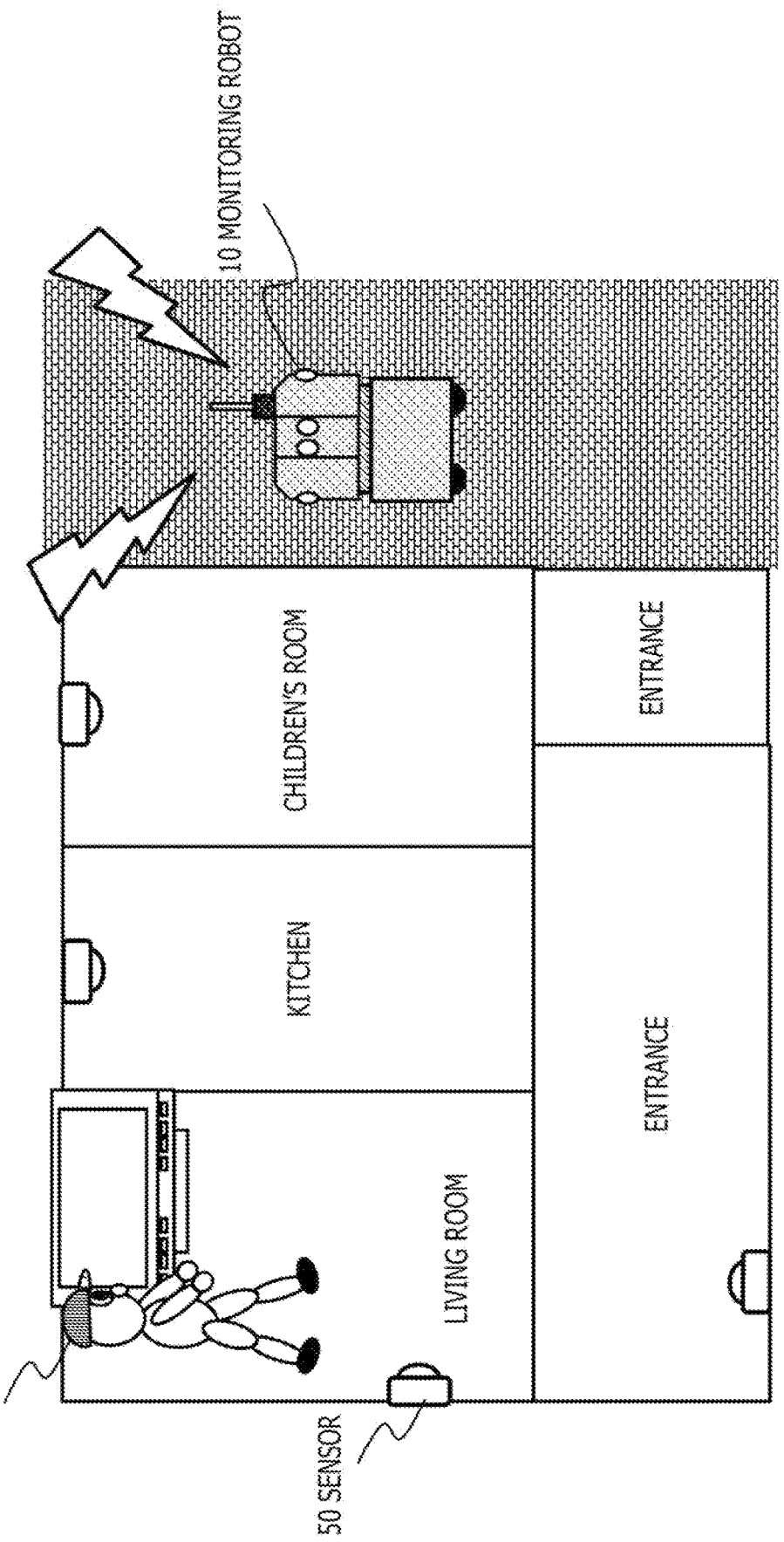
FIG. 8 is a diagram describing an example of a process performed by the monitoring robot of the present disclosure.

FIG. 8 illustrates a manner in which the delivery person 20 performs a process of carrying a television set to a living room of the user's apartment and setting up the television set.

In such a case, the behavior of the delivery person 20 is monitored by a sensor 50 in the user's apartment. Sensor detection information is notified to the monitoring robot 10 to monitor whether the delivery person 20 behaves suspiciously. In the case where a suspicious behavior is detected, the monitoring robot 10 issues an alert, updates the profile information, notifies the security company, or performs some other action.

It should be noted that the suspicious behavior of the delivery person 20 includes intrusion into a room other than the room where the package is to be installed, speaking loudly, and the like. In the case where any of these behaviors is detected by the sensor 50, the monitoring robot 10 issues an alert or updates the profile information of the delivery person 20. Further, in the case where the delivery person 20 continues with the violative behavior even after the alert has been issued, the monitoring robot 10 notifies the security company to call the security guard.

A description will be given of other examples of the processes performed by the monitoring robot 10 with reference to FIGS. 9 and 10.

Figure 9:
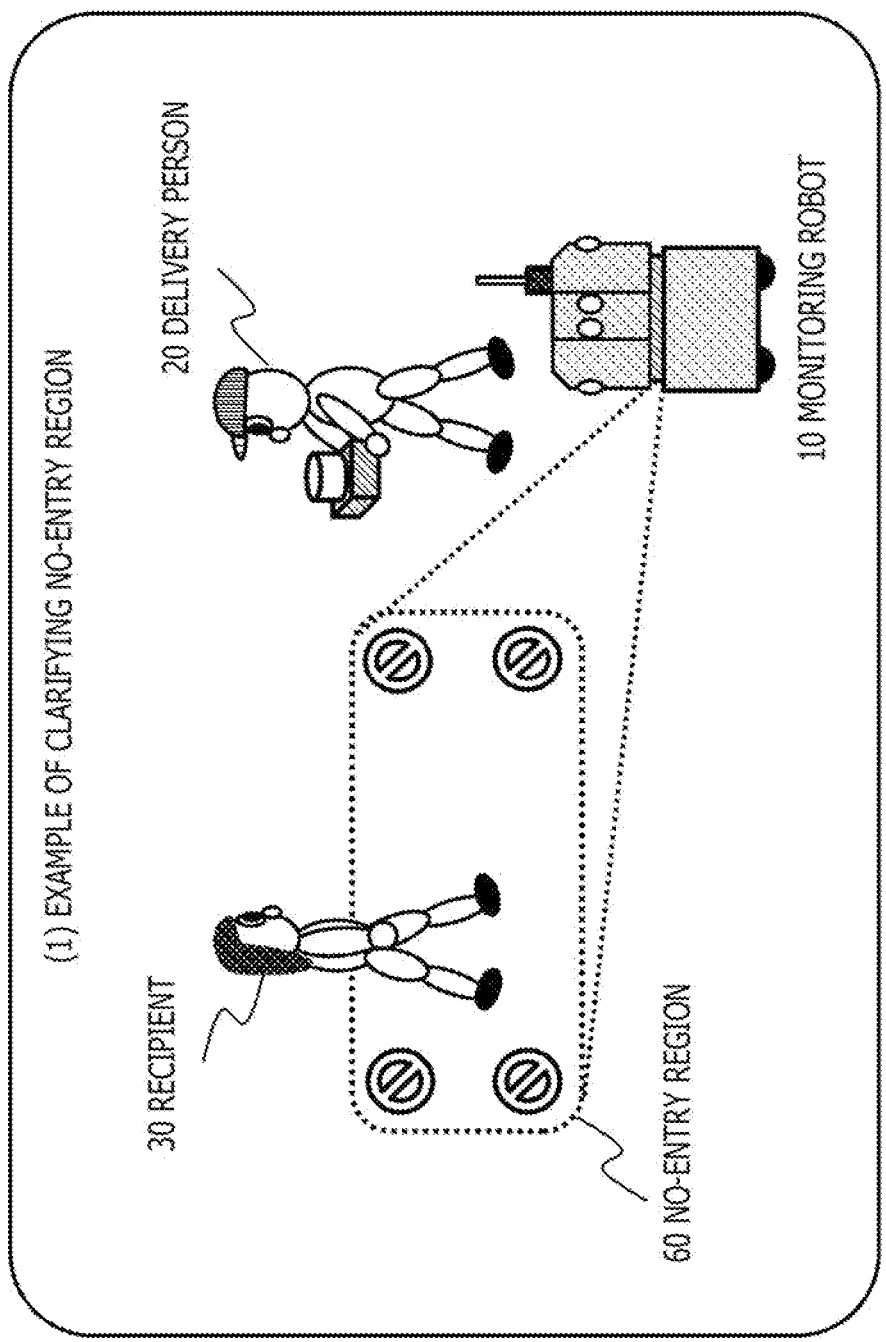
FIG. 9 is a diagram describing an example of a process performed by the monitoring robot of the present disclosure.

FIG. 9 illustrates an example of a process in which the monitoring robot 10 shows a no-entry region 60 for the delivery person 20 as a spotlight.

In the case where the delivery person 20 intrudes into the no-entry region 60, the monitoring robot 10 issues an alert or updates the profile information of the delivery person 20. Further, in the case where the delivery person 20 continues with the violative behavior even after the alert has been issued, the monitoring robot 10 notifies the security company to call the security guard.

Figure 10:
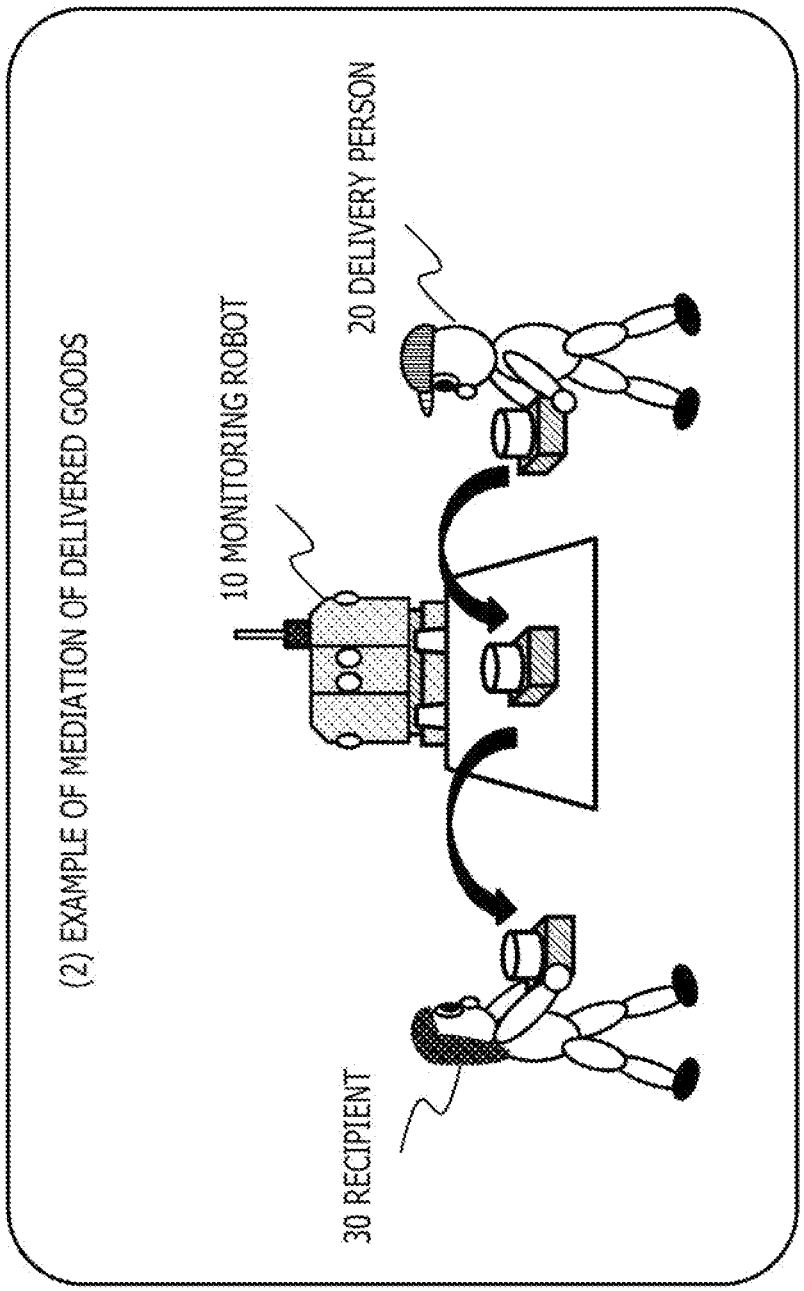
FIG. 10 is a diagram describing an example of a process performed by the monitoring robot of the present disclosure.

FIG. 10 illustrates an example of a delivery mediation process in which the package carried by the delivery person 20 is transferred to the recipient 30 via the monitoring robot 10 rather than directly handing the package over to the recipient 30.

The delivery person 20 passes the package to the monitoring robot 20, and then the recipient 30 receives the package via the monitoring robot 10.

Such a process allows the recipient 30 to receive the package without meeting the delivery person 20 face to face.

[2. Configuration Example of the Information Processing System of the Present Disclosure]

A description will be given next of a configuration example of an information processing system of the present disclosure.

Figure 11:
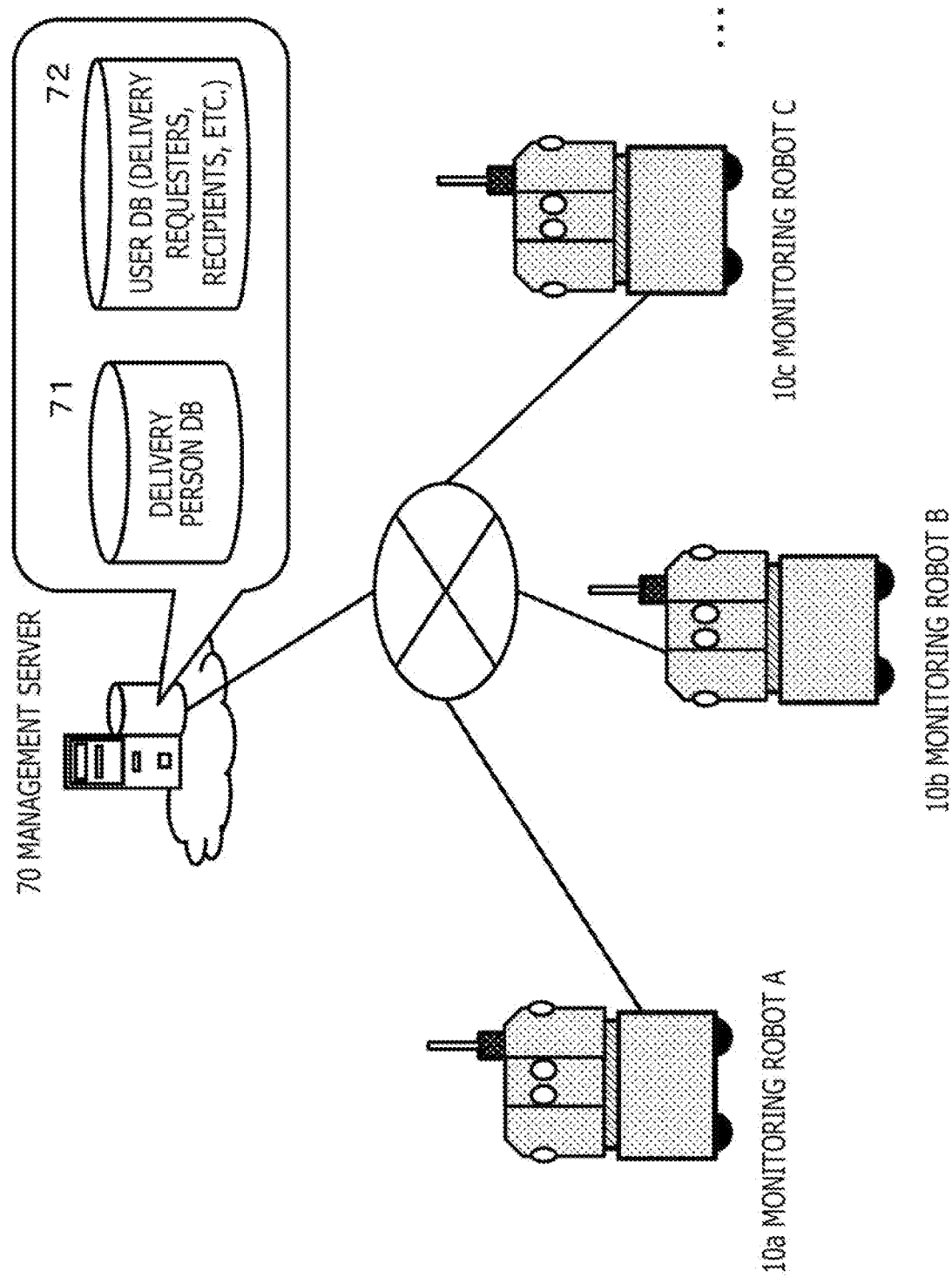
FIG. 11 is a diagram describing an example of an information processing system of the present disclosure.

FIG. 11 is a diagram illustrating a configuration example of the information processing system of the present disclosure.

The information processing system includes a configuration in which a plurality of monitoring robots 10a, 10b, 10c, and so on and a management server 80 can communicate with each other via a network.

A management server 70 includes a delivery person database 71 and a user database 72. The profile information of delivery persons is recorded in the delivery person database 71. The profile information of users (e.g., package delivery requesters, recipients) is registered in the user database 72.

A variety of pieces of profile information such as not only face images of delivery persons but also their ages, genders, physiques, numbers of years of service, user evaluation information, past problem information, and criminal records are recorded in the delivery person database 71 as the profile information of delivery persons.

Also, the users' genders, ages, and physiques, presence or absence of housemates, number or makeup of housemates, package delivery usage histories, past problem information, and the like are recorded in the user database 72 as the profile information of users (e.g., package delivery requesters, recipients). Further, in addition to these pieces of information, for example, information regarding users' desires as to a manner of receiving packages at the time of receipt, specifically, how to receive packages in such cases where users do not want to meet the delivery persons face to face, that is, information regarding whether meeting is permitted or denied is also recorded.

It should be noted that these pieces of information registered in the databases may be stored in the storage section of the monitoring robot 10.

In the configuration illustrated in FIG. 11, each of the monitoring robots 10 sends, to the management server 70, detection information of the sensor such as a camera provided in the monitoring robot.

The management server 70 identifies the delivery person by comparing the image received from the monitoring robot 10 with the delivery person information stored in advance in the delivery person database 71.

The profile information such as not only the face images of the registered delivery persons but also their ages, genders, physiques, numbers of years of service, user evaluation information, and criminal records is stored in the delivery person database 71, and the management server determines a behavior monitoring mode of monitoring the behavior of the delivery person 20, a permissible behavior, and a control mode on the basis of these pieces of the profile information and notifies determined information to the monitoring robot 10.

The monitoring robot 10 monitors the delivery person 20 and performs control according to the notice received from the management server.

It should be noted that, in the case where there are two or more delivery persons, the management server determines the monitoring mode in consideration of not only the profile information of each delivery person but also the number of delivery persons.

Figure 12:
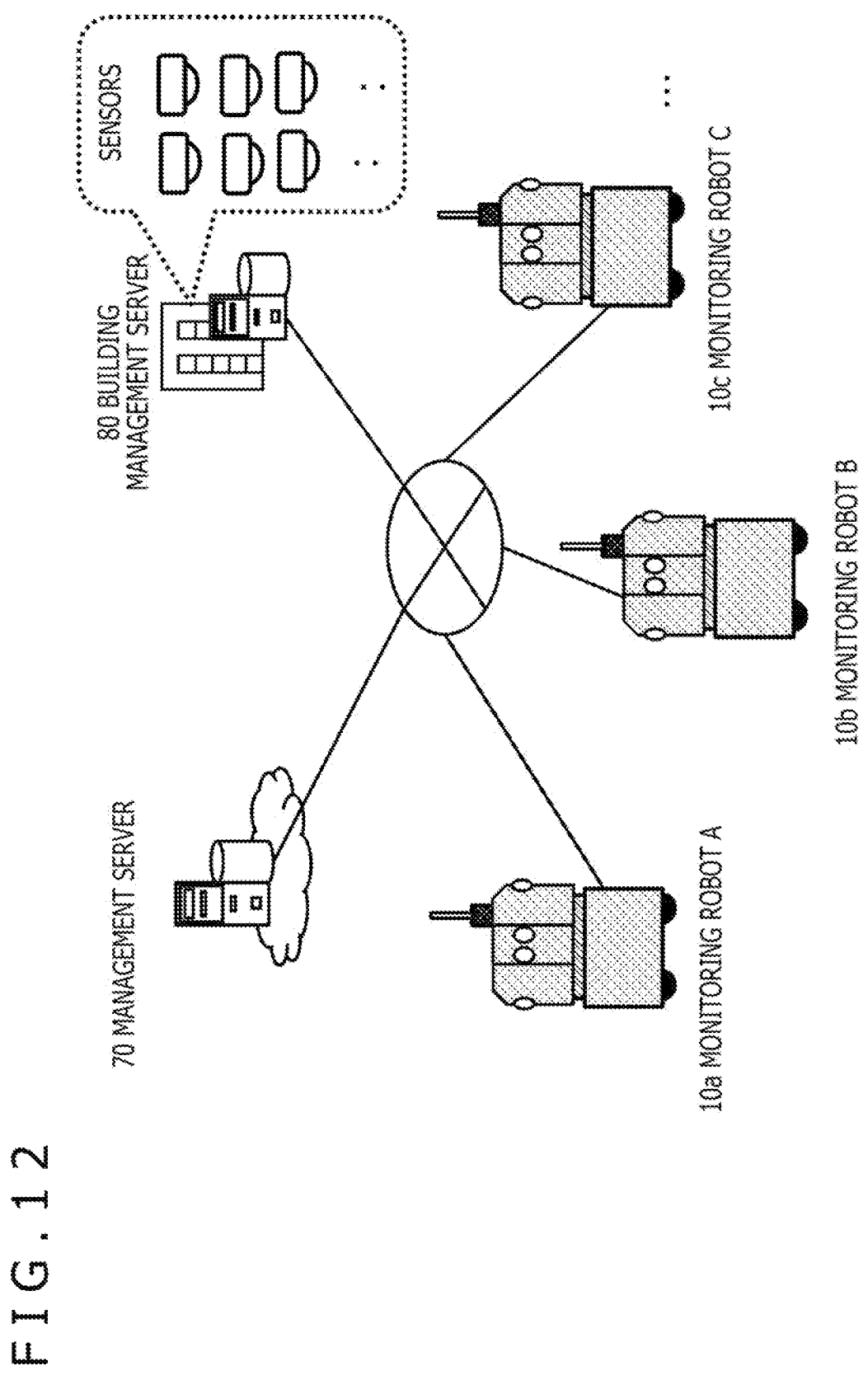
FIG. 12 is a diagram describing an example of the information processing system of the present disclosure.

Further, a building management server 80 may be connected to the network as illustrated in FIG. 12. The building management server 80 illustrated in FIG. 12 is a management server for managing, for example, a condominium where monitoring robots 10 are grounded.

The building management server 80 analyzes the behavior of the delivery person by analyzing detection information of cameras and other sensors provided in the respective rooms, aisles, or the like in the condominium. Analysis information is notified to the management server 70 and the monitoring robot 10 that is present near the delivery person.

The management server 70 and the monitoring robot 10 that is present near the delivery person intensively monitor the delivery person, and in the case where the delivery person continues to behave suspiciously, the management server 70 and the monitoring robot 10 issue an alert or notify the security company.

It should be noted that, in the configuration illustrated in FIG. 11, the detection information of the sensors in the condominium or the like is sent to the management server 70 or the monitoring robot via the sensors or a communication section in the building without mediation of the building management server.

[3. Configuration Example of the Monitoring Robot]

A description will be given next of a configuration example of the monitoring robot 10 which is the information processing apparatus of the present disclosure.

Figure 13:
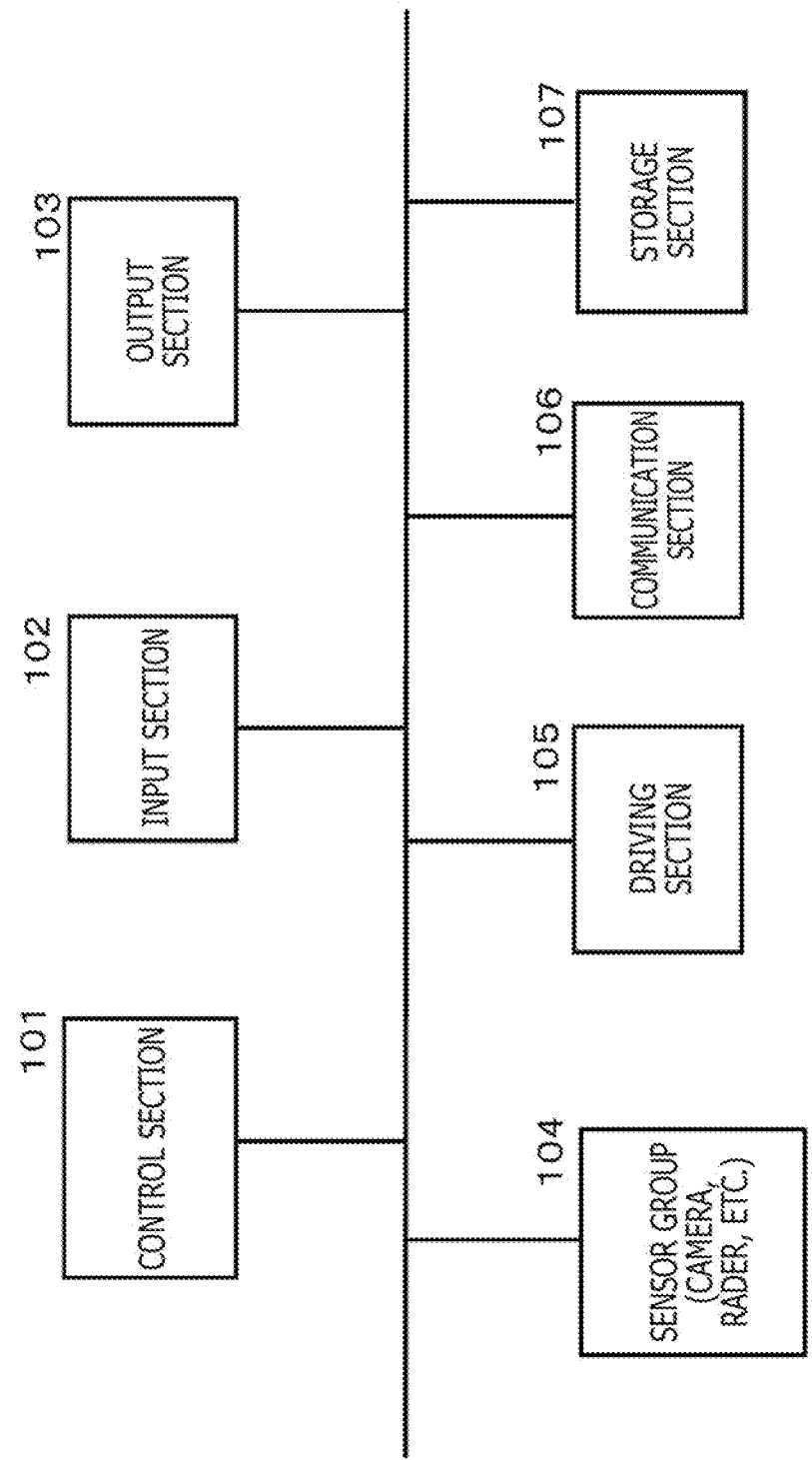
FIG. 13 is a diagram describing an example of a positional configuration of the monitoring robot of the present disclosure.

FIG. 13 is a block diagram illustrating the configuration example of the monitoring robot 10 which is the information processing apparatus of the present disclosure.

As illustrated in FIG. 13, the monitoring robot 10 includes a control section 101, an input section 102, an output section 103, a sensor group 104, a driving section 105, a communication section 106, and a storage section 107.

The control section 101 controls the processes performed by the monitoring robot 10. For example, the control section 101 performs processes in accordance with a control program stored in the storage section 107. The control section 101 includes a processor that has a program execution function.

The input section 102 is an interface through which a variety of pieces of data can be input by the user and includes a touch panel, a code reading section, various switches, and the like.

The output section 103 is a speaker for outputting an alert and a sound, a display for outputting an image, and further an output section for outputting a spotlight or the like.

The sensor group 104 includes a variety of types of sensors such as a camera, a microphone, a radar, and a distance sensor.

The driving section 105 includes a wheel driving section, a direction control mechanism, and the like for moving the monitoring robot.

The communication section 106 performs, for example, the process of communicating with external equipment such as the management server, the building management server, and the sensors.

The storage section 107 stores, for example, the profile information of delivery persons and the profile information of users (e.g., delivery requesters, recipients) in addition to the program executed by the control section 101.

[4. Sequence of Process Performed by the Monitoring Robot]

As described with reference to FIGS. 1 to 9 earlier, the monitoring robot 10 which is the information processing apparatus of the present disclosure performs a variety of processes such as the delivery person identification process and the monitoring process.

Figure 14:
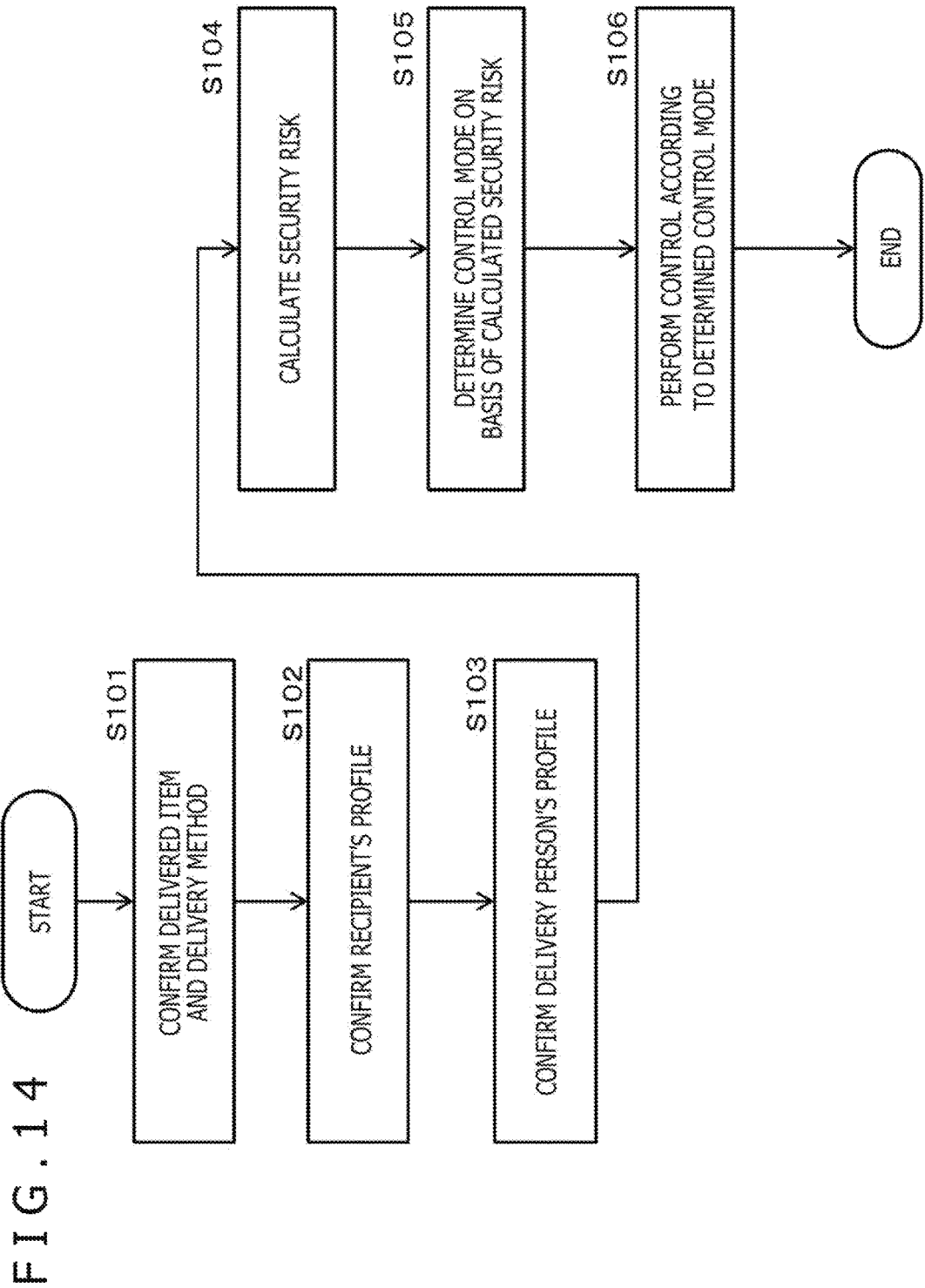
FIG. 14 is a diagram illustrating a flowchart describing a sequence of process performed by the monitoring robot of the present disclosure.

A flowchart illustrated in FIG. 14 describes an example of a sequence of process performed by the monitoring robot 10.

The process according to the flowchart illustrated in FIG. 14 can be performed by the control section (data processing section) of the monitoring robot 10, for example, in accordance with a program stored in the storage section of the monitoring robot 10. For example, the process can be performed by the processor such as a CPU having the program execution function as a program execution process.

Some steps of the flow illustrated in FIG. 14 can also be performed as processing steps of a management server capable of communicating with the monitoring robot 10 or the like.

In the description given below, an example will be described in which the monitoring robot 10 performs all the processing steps.

Each processing step of the flow illustrated in FIG. 14 will be described below.

(Step S101)

First, when detecting a delivery person who has entered a management area of a condominium or the like, the monitoring robot 10 identifies the delivery person by capturing a face image of the delivery person and comparing the captured image with face images of delivery persons registered in the storage section or the database of the management server.

Further, the monitoring robot 10 confirms the delivery destination of a package delivered by the delivery person. For example, the monitoring robot 10 confirms the delivery destination by reading code information such as a barcode or a QR code (registered trademark) attached to the package or the like. It should be noted that the monitoring robot 10 may perform the confirmation on the basis of data input by the delivery person.

(Step S102)

Next, the monitoring robot confirms the profile of the recipient of the package in step S102. The profile information of package recipients is registered in the storage section of the monitoring robot or the database of the management server, and the monitoring robot confirms the profile by acquiring these pieces of registered data.

It should be noted that, in addition to the users' genders, ages, and physiques, package delivery usage histories, past problem information, and the like, for example, information regarding users' desires as to a manner of receiving packages at the time of receipt, specifically, information regarding users' desires as to how to receive packages in such cases where users do not want to meet the delivery persons face to face, is also recorded as the profile information of the package recipients as described earlier.

(Step S103)

Next, the monitoring robot confirms, in step S103, the profile of the delivery person identified in step S101. The profile information of delivery persons is also registered in the storage section of the monitoring robot or the database of the management server, and the monitoring robot confirms the profile by acquiring these pieces of registered data.

It should be noted that, as described earlier, a variety of pieces of profile information such as not only face images of delivery persons but also their ages, genders, physiques, numbers of years of service, user evaluation information, past problem information, and criminal records are included in the profile information of delivery persons recorded in the storage section.

(Step S104)

Next, the monitoring robot calculates a security risk of the package delivery in step S104.

This security risk calculation process calculates the security risk on the basis of the profile information of the package recipient acquired in step S102 and the profile information of the delivery person acquired in step S103.

For example, in the case where the package recipient is female, the security risk is determined to be high. Also, in the case where the delivery person or the recipient caused a problem in the past, the security risk is determined to be high.

An algorithm for calculating this security risk is prescribed in advance, and the monitoring robot calculates a security risk value in accordance with the prescribed algorithm, by using the profile information of the package recipient acquired in step S102 and the profile information of the delivery person acquired in step S103 as input parameters.

It should be noted that, in the case where there are two or more delivery persons, the monitoring robot individually acquires the profile of each delivery person and calculates the security risk in consideration of the number of delivery persons.

(Step S105)

Next, the monitoring robot determines, in step S105, the control mode on the basis of the security risk value of the package delivery calculated in step S104.

The term "control mode" specifically refers to a mode in which the delivery person is monitored, in which the behavior of the delivery person is restricted, or the like.

For example, in the case where the security risk value of the package delivery calculated in step S104 is high, the monitoring of the delivery person is set to a severe level, thus placing a more severe restriction on the behavior of the delivery person. For example, a process is performed to set control such that the delivery person is prohibited from meeting the recipient face to face and the package is transferred via the monitoring robot.

(Step S106)

Next, the monitoring robot performs control in step S106 according to the control mode determined in step S105.

That is, the monitoring robot performs control such that the behavior of the delivery person is monitored and restricted according to the control mode determined in step S105.

It should be noted that, although it has been described in the above embodiment that the package delivery persons are targets to be monitored by the monitoring robots, the targets to be monitored by the monitoring robots are not limited to the package delivery persons. That is, it is possible to include all of a variety of visitors as the targets to be monitored.

[5. Example of Hardware Configuration of Each Apparatus]

A description will be given next of an example of a hardware configuration of the monitoring robot 10, the management server 70, and the building management server 80 with reference to FIG. 15.

The hardware configuration illustrated in FIG. 15 illustrates an example of the hardware configuration applicable to these apparatuses.

A CPU (Central Processing Unit) 301 functions as a data processing section that performs various processes in accordance with programs stored in a ROM (Read Only Memory) 302 or a storage section 308. For example, the CPU 301 performs a process according to the sequence described in the above embodiment. A RAM (Random Access Memory) 303 stores the programs executed by the CPU 301 and data. The CPU 301, the ROM 302, and the RAM 303 are connected to each other via a bus 304.

The CPU 301 is connected to an input/output interface 305 via the bus 304, and an input section 306 and an output section 307 are connected to the input/output interface 305. The input section 306 includes various switches, a keyboard, a touch panel, a mouse, a microphone, and the like. The output section 307 includes a display, a speaker, and the like.

The storage section 308 connected to the input/output interface 305 includes, for example, a hard disk and the like and stores the programs executed by the CPU 301 and various pieces of data. A communication section 309 functions as a transmission/reception section for data communication via a network such as the Internet or a local area network and communicates with external apparatuses.

A drive 310 connected to the input/output interface 305 records or reads data by driving a removable medium 311 such as a magnetic disk, an optical disk, a magneto-optical disk, or a semiconductor memory such as a memory card.

[6. Conclusion Regarding the Configuration of the Present Disclosure]

The embodiment of the present disclosure has been described in detail above with reference to a specific embodiment. However, it is apparent that a person skilled in the art can modify or substitute for the embodiment without departing from the gist of the present disclosure. That is, the present invention has been disclosed in the form of illustration and should not be construed restrictively. In order to determine the gist of the present disclosure, the claims should be taken into account.

It should be noted that the technology disclosed in the present specification can have the following configurations:

(1) An information processing apparatus including:
a data processing section configured to monitor a behavior of a visitor, in which
the data processing section identifies the visitor, acquires profile information of the identified visitor, determines a behavior monitoring mode of the visitor on the basis of the profile information of the visitor, and monitors the behavior of the visitor according to the determined behavior monitoring mode.

(2) The information processing apparatus of feature (1), in which
the data processing section calculates a security risk on the basis of the profile information of the visitor and determines the behavior monitoring mode of the visitor according to the calculated security risk.

(3) The information processing apparatus of feature (1) or (2), in which
the data processing section acquires profile information of a user visited by the visitor and determines the behavior monitoring mode of the visitor on the basis of the profile information of the visitor and the profile information of the visited user.

(4) The information processing apparatus of any one of features (1) to (3), in which
the data processing section acquires profile information of a user visited by the visitor, calculates a security risk on the basis of the profile information of the visitor and the profile information of the visited user, and determines the behavior monitoring mode of the visitor on the basis of the calculated security risk.

(5) The information processing apparatus of any one of features (1) to (4), in which
the profile information of the visitor includes at least any of gender, age, or physique of the visitor and the number of visitors.

(6) The information processing apparatus of feature (3), in which
the profile information of the visited user includes at least any of gender, age, or physique of the visited user and the number of visited users.

(7) The information processing apparatus of feature (3), in which
the profile information of the visited user includes information regarding whether the visited user permits or denies meeting the visitor.

(8) The information processing apparatus of any one of features (1) to (7), in which,
in a case where an impermissible behavior is detected while the behavior of the visitor is monitored, the data processing section issues an alert.

(9) The information processing apparatus of any one of features (1) to (8), in which,
in a case where an impermissible behavior is detected while the behavior of the visitor is monitored, the data processing section updates the profile information of the visitor.

(10) The information processing apparatus of any one of features (1) to (9), in which,
in a case where an impermissible behavior is detected while the behavior of the visitor is monitored, the data processing section notifies a security company.

(11) The information processing apparatus of any one of features (1) to (10), including:
a driving section configured to move the information processing apparatus as the visitor moves.

(12) The information processing apparatus of any one of features (1) to (11), including:
an output section configured to illuminate a spotlight region indicating an entry permitted region for the visitor.

(13) An information processing system including:
a monitoring robot; and
a management server, in which
the monitoring robot sends a captured image of a visitor to the management server,
the management server identifies the visitor on the basis of the image received from the monitoring robot, acquires profile information of the identified visitor, determines a behavior monitoring mode of the visitor on the basis of the profile information of the visitor, and sends the determined behavior monitoring mode to the monitoring robot, and
the monitoring robot monitors a behavior of the visitor according to the behavior monitoring mode received from the management server.

(14) The information processing system of feature (13), in which
the management server calculates a security risk on the basis of the profile information of the visitor and determines the behavior monitoring mode of the visitor according to the calculated security risk.

(15) The information processing system of feature (13) or (14), in which
the management server acquires profile information of a user visited by the visitor, calculates a security risk on the basis of the profile information of the visitor and the profile information of the visited user, and determines the behavior monitoring mode of the visitor according to the calculated security risk.

(16) An information processing method performed by an information processing apparatus, the information processing apparatus including a data processing section configured to monitor a behavior of a visitor, in which the data processing section identifies the visitor, acquires profile information of the identified visitor, determines a behavior monitoring mode of the visitor on the basis of the profile information of the visitor, and monitors the behavior of the visitor according to the determined behavior monitoring mode.

(17) An information processing method performed by an information processing system including a monitoring robot and a management server, in which the monitoring robot sends a captured image of a visitor to the management server, the management server identifies the visitor on the basis of the image received from the monitoring robot, acquires profile information of the identified visitor, determines a behavior monitoring mode of the visitor on the basis of the profile information of the visitor, and sends the determined behavior monitoring mode to the monitoring robot, and the monitoring robot monitors a behavior of the visitor according to the behavior monitoring mode received from the management server.

(18) A program for causing an information processing apparatus to perform information processing, the information processing apparatus including a data processing section configured to monitor a behavior of a visitor, the program causing the data processing section to perform:

a process of identifying the visitor and acquiring profile information of the identified visitor;

a process of determining a behavior monitoring mode of the visitor on the basis of the profile information of the visitor; and a process of monitoring the behavior of the visitor according to the determined behavior monitoring mode.

It should be noted that a series of processes described in the specification can be performed by hardware, software, or a combination thereof. In the case where the processes are performed by software, a program having a processing sequence recorded therein is installed to a memory in a computer incorporated in dedicated hardware for execution. Alternatively, the program can be installed to a general-purpose computer capable of performing various processes for execution. For example, the program can be recorded in advance in a recording medium. In addition to being installed to the computer from the recording medium, the program can be received via a network such as a LAN (Local Area Network) or the Internet and installed to a recording medium such as a built-in hard disk.

Also, various processes described in the specification may be performed not only chronologically according to the description but also in parallel or individually according to processing capability of the apparatus that performs the processes or as necessary. Also, the term "system" in the present specification refers to a logical set of plurality of apparatuses, and the apparatuses each serving as a component are not necessarily accommodated in the same enclosure.

INDUSTRIAL APPLICABILITY

As described above, according to a configuration of an embodiment of the present disclosure, a configuration is realized that monitors a behavior of a visitor and issues an alert or performs some other action in the case where a suspicious behavior is detected.

Specifically, for example, the configuration includes a data processing section configured to monitor the behavior of the visitor. The data processing section identifies the visitor, acquires profile information of the identified visitor, determines a behavior monitoring mode of the visitor on the basis of the profile information, and monitors the behavior of the visitor according to the determined behavior monitoring mode. For example, the data processing section calculates a security risk on the basis of the profile information of the visitor and profile information of a visited user, determines the behavior monitoring mode of the visitor according to the calculated security risk, performs a process of monitoring the behavior of the visitor according to the determined mode, and issues an alert or performs some other action in the case where a suspicious behavior is detected.

The present configuration realizes a configuration that monitors the behavior of the visitor and issues an alert or performs some other action in the case where a suspicious behavior is detected.

REFERENCE SIGNS LIST

10: Monitoring robot
20: Delivery person
30: Recipient
50: Sensor
70: Management server
71: Delivery person database
72: User database
80: Building management server
101: Control section
102: Input section
103: Output section
104: Sensor group
105: Driving section
106: Communication section
107: Storage section
301: CPU
302: ROM
303: RAM
304: Bus
305: Input/output interface
306: Input section
307: Output section
308: Storage section
309: Communication section
310: Drive
311: Removable medium

The invention claimed is:

1. An information processing apparatus comprising:
a data processing section configured to monitor a behavior of a visitor, wherein
the data processing section identifies the visitor, acquires profile information of the identified visitor, determines a behavior monitoring mode of the visitor on a basis of the profile information of the visitor, and monitors the behavior of the visitor according to the determined behavior monitoring mode.

2. The information processing apparatus of claim 1, wherein
the data processing section calculates a security risk on the basis of the profile information of the visitor and determines the behavior monitoring mode of the visitor according to the calculated security risk.

3. The information processing apparatus of claim 1, wherein
the data processing section acquires profile information of a user visited by the visitor and determines the behavior monitoring mode of the visitor on a basis of the profile information of the visitor and the profile information of the visited user.

4. The information processing apparatus of claim 1, wherein
the data processing section acquires profile information of a user visited by the visitor, calculates a security risk on a basis of the profile information of the visitor and the profile information of the visited user, and determines the behavior monitoring mode of the visitor on a basis of the calculated security risk.

5. The information processing apparatus of claim 1, wherein
the profile information of the visitor includes at least any of gender, age, or physique of the visitor and the number of visitors.

6. The information processing apparatus of claim 3, wherein
the profile information of the visited user includes at least any of gender, age, or physique of the visited user and the number of visited users.

7. The information processing apparatus of claim 3, wherein
the profile information of the visited user includes information regarding whether the visited user permits or denies meeting the visitor.

8. The information processing apparatus of claim 1, wherein,
in a case where an impermissible behavior is detected while the behavior of the visitor is monitored, the data processing section issues an alert.

9. The information processing apparatus of claim 1, wherein,
in a case where an impermissible behavior is detected while the behavior of the visitor is monitored, the data processing section updates the profile information of the visitor.

10. The information processing apparatus of claim 1, wherein,
in a case where an impermissible behavior is detected while the behavior of the visitor is monitored, the data processing section notifies a security company.

11. The information processing apparatus of claim 1, comprising:
a driving section configured to move the information processing apparatus as the visitor moves.

12. The information processing apparatus of claim 1, comprising:
an output section configured to illuminate a spotlight region indicating an entry permitted region for the visitor.

13. An information processing system comprising:
a monitoring robot; and
a management server, wherein
the monitoring robot sends a captured image of a visitor to the management server,
the management server identifies the visitor on a basis of the image received from the monitoring robot, acquires profile information of the identified visitor, determines a behavior monitoring mode of the visitor on a basis of the profile information of the visitor, and sends the determined behavior monitoring mode to the monitoring robot, and
the monitoring robot monitors a behavior of the visitor according to the behavior monitoring mode received from the management server.

14. The information processing system of claim 13, wherein
the management server calculates a security risk on the basis of the profile information of the visitor and determines the behavior monitoring mode of the visitor according to the calculated security risk.

15. The information processing system of claim 13, wherein
the management server acquires profile information of a user visited by the visitor, calculates a security risk on a basis of the profile information of the visitor and the profile information of the visited user, and determines the behavior monitoring mode of the visitor according to the calculated security risk.

16. An information processing method performed by an information processing apparatus, the information processing apparatus including
a data processing section configured to monitor a behavior of a visitor, wherein
the data processing section identifies the visitor, acquires profile information of the identified visitor, determines a behavior monitoring mode of the visitor on a basis of the profile information of the visitor, and monitors the behavior of the visitor according to the determined behavior monitoring mode.

17. An information processing method performed by an information processing system including a monitoring robot and a management server, wherein
the monitoring robot sends a captured image of a visitor to the management server,
the management server identifies the visitor on a basis of the image received from the monitoring robot, acquires profile information of the identified visitor, determines a behavior monitoring mode of the visitor on a basis of the profile information of the visitor, and sends the determined behavior monitoring mode to the monitoring robot, and
the monitoring robot monitors a behavior of the visitor according to the behavior monitoring mode received from the management server.

18. A program for causing an information processing apparatus to perform information processing, the information processing apparatus including
a data processing section configured to monitor a behavior of a visitor,
the program causing the data processing section to perform:
a process of identifying the visitor and acquiring profile information of the identified visitor;
a process of determining a behavior monitoring mode of the visitor on a basis of the profile information of the visitor; and
a process of monitoring the behavior of the visitor according to the determined behavior monitoring mode.

* * * * *